(12) United States Patent
Yang et al.

(10) Patent No.: US 7,535,710 B2
(45) Date of Patent: May 19, 2009

(54) ELECTRONIC DEVICE

(75) Inventors: Shun-Chieh Yang, Taipei County (TW); Chi-Hong Chen, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 12 days.

(21) Appl. No.: 11/748,442

(22) Filed: May 14, 2007

(65) Prior Publication Data
US 2007/0268666 A1  Nov. 22, 2007

(30) Foreign Application Priority Data
May 18, 2006  (TW) .............................. 95117601 A

(51) Int. Cl.
*H05K 7/20* (2006.01)
(52) U.S. Cl. .................. 361/695; 361/690; 165/104.33; 174/16.1; 454/184
(58) Field of Classification Search .................. None
See application file for complete search history.

(56) References Cited

U.S. PATENT DOCUMENTS

| | | | | |
|---|---|---|---|---|
| 5,559,673 A | * | 9/1996 | Gagnon et al. | 361/695 |
| 5,691,883 A | * | 11/1997 | Nelson | 361/697 |
| 5,963,424 A | * | 10/1999 | Hileman et al. | 361/695 |
| 6,113,485 A | * | 9/2000 | Marquis et al. | 454/184 |
| 6,333,851 B1 | * | 12/2001 | Shih | 361/695 |
| 6,422,730 B1 | * | 7/2002 | Koren et al. | 362/580 |
| 6,735,080 B1 | * | 5/2004 | Chang | 361/695 |
| 7,035,102 B2 | * | 4/2006 | Holmes et al. | 361/695 |
| 7,158,378 B2 | * | 1/2007 | Hinzpeter et al. | 361/695 |
| 7,270,419 B2 | * | 9/2007 | Russell et al. | 353/61 |
| 2006/0181846 A1 | * | 8/2006 | Farnsworth et al. | 361/695 |

FOREIGN PATENT DOCUMENTS

| | | |
|---|---|---|
| JP | 07-295097 | 11/1995 |
| JP | 2003-035930 | 2/2003 |
| TW | 514350 | 12/2002 |
| TW | 524319 | 3/2003 |

* cited by examiner

*Primary Examiner*—Boris L Chervinsky

(57) ABSTRACT

An electronic device. The electronic device includes a housing, a passage, and a plurality of first fans. The housing has an inner space, with the passage disposed therein. The plurality of first fans is disposed in the passage in series. The electronic device further comprises a second fan, the housing comprising an inlet, wherein the second fan is disposed in the vicinity of the inlet.

9 Claims, 1 Drawing Sheet

ELECTRONIC DEVICE

BACKGROUND OF THE INVENTION

1. Field of the Invention

The invention relates to a projector, utilizing serially disposed fans to minimize noise.

2. Description of the Related Art

Conventional projectors utilize fans to dissipate heat accumulated within. In the arrangement thereof, a single fan, or more than one axially disposed fans, are provided therein, increasing air volume.

While increasing the number of fans increases air volume, noise produced by the fans is increased commensurately. Thus, increasing air volume without corresponding increase in noise is an important consideration.

BRIEF SUMMARY OF THE INVENTION

The invention provides an electronic device comprising a housing, a passage, and a plurality of first fans. The housing has an inner space, with the passage disposed therein. The plurality of first fans is disposed in the passage in series.

The electronic device further comprises a second fan. The housing comprises an inlet. The second fan is disposed in the vicinity of the inlet.

The second fan is disposed between the inlet and the passage.

The second fan has an inflow surface and an outflow surface. The inflow surface faces the inlet, and a portion of the outflow surface faces the passage.

The electronic device further comprises a heat source, and at least part of the heat source is disposed in the passage, wherein the heat source is a light module.

The first fans comprise two fans, and each of the two fans is disposed on two sides of the heat source respectively.

The electronic device is a projector.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
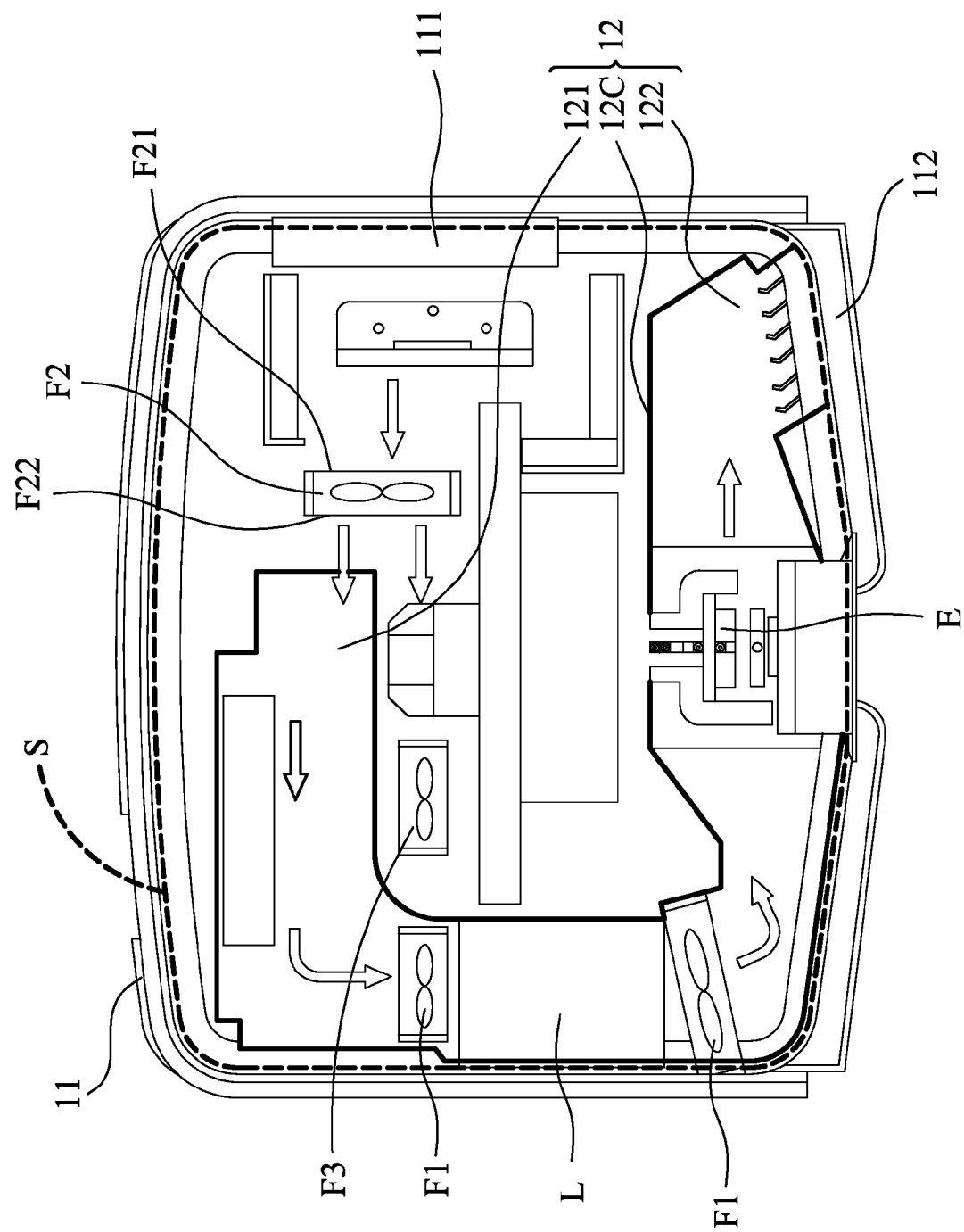
FIG. 1 is a schematic view showing the interior of an electronic device of the invention.

Referring to FIG. 1, in the embodiment, the electronic device is a projector 10, particularly a large projector. The projector 10 comprises a housing 11, a passage 12, a light module L, an optical engine E, two first fans F1, a second fan F2, and a blower F3, wherein the housing 11 has an inner space S.

The housing 11 comprises an inlet 111 and an outlet 112. The passage 12 is a cooling tunnel disposed in the inner space S of the housing 11, exhausting heat to the exterior of the housing 11. The passage 12, arranged adjacent to the optical engine E, comprises a casing 12C, a first end 121 (entrance) and a second end 122 (exit), wherein the casing 12C is disposed in the housing 11, and the first end 121 (entrance) and the second end 122 (exit) are disposed corresponding to the inlet 111 and the outlet 112 respectively. Interior of the casing 12C is communicated with the inner space S through the first end 121 (entrance). The second end 122 (exit) connects to the outlet 112 to exhaust air within the casing 12C.

The light module L, disposed in the passage, is the main heat source of the projector 10. The first fans F1 are disposed in the passage, respectively located on two sides of the light module L in series.

The second fan F2 is disposed in the inner space S, between the inlet 111 and the first end 121 (entrance) of the passage 12. The second fan F2 has an inflow surface F21 and an outflow surface F22, wherein the inflow surface F21 faces the inlet 111, and a portion of the outflow surface F22 faces the first end 121 (entrance) of the passage 12.

The blower F3 is disposed in the inner space S, in the vicinity of the light module L, dissipating heat therefrom.

Air enters the housing 11 from the inlet 111, through the second fan F2, toward the passage 12 and the inner space S (as shown by arrows in FIG. 1). Air, entering the passage 12, flows past the first first fan F1, the light module L, and the second first fan F1, successively, and is then exhausted by the outlet 112. Air, entering the inner space S, dissipates heat from other heat sources.

The first fans F1 of the projector 10 are disposed in the passage in series, and the fan speed is kept low, such that air volume is increased while noise is minimized. In other words, in order for the system to maintain a temperature range, a certain amount of air volume is required to dissipate heat. If the air volume is provided by a single fan, the requisite fan speed of the single fan must be relatively high, producing considerable noise. If the same volume of air is provided by serially disposed fans, the fan speed of the fans can be relatively lower, decreasing generated noise.

Noise produced by the fan can be minimized by selecting appropriate fan size, and optimizing design and control of the fan, satisfying air volume and pressure requirements thereof with maximized operating efficiency. As a result, with different sized first fans disposed in the passage 12 in series, fan speed can be lowered slightly while provide more air volume and lower noise from each.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
    a housing having an inner space;
    a passage comprising a casing and an entrance, wherein the casing is disposed in the inner space and interior of the casing is communicated with the inner space through the entrance; and
    a plurality of first fans disposed in the passage in series.

2. The electronic device as claimed in claim 1, wherein the electronic device is a projector.

3. The electronic device as claimed in claim 1, wherein the housing further comprises an outlet, and the passage further comprises an exit connecting to the outlet to exhaust air within the casing.

4. The electronic device as claimed in claim 1, further comprising a second fan, wherein the second fan has an inflow surface and an outflow surface, and at least a portion of the outflow surface faces the entrance and generates airflow partially flowing into the casing through the entrance.

5. The electronic device as claimed in claim 4, wherein the housing comprising an inlet, wherein the second fan is disposed in the vicinity of the inlet.

6. The electronic device as claimed in claim 4, wherein the second fan is disposed between the inlet and the passage, and the inflow surface faces the inlet.

7. The electronic device as claimed in claim 4, further comprising a heat source, wherein at least part of the heat source is disposed in the passage.

8. The electronic device as claimed in claim 7, wherein the heat source is a light module.

9. The electronic device as claimed in claim 7, wherein the first fans comprise two fans, and each of the two fans is disposed on each side of the two sides of the heat source respectively.

* * * * *